United States Patent
Kim et al.

(10) Patent No.: US 12,472,868 B2
(45) Date of Patent: Nov. 18, 2025

(54) MESSAGE TRANSMISSION SYSTEM FOR MOBILITY VEHICLE

(71) Applicant: HYUNDAI MOBIS CO., LTD., Seoul (KR)

(72) Inventors: Do Hyoung Kim, Yongin-si (KR); Seok Hoon Ko, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 178 days.

(21) Appl. No.: 18/480,108

(22) Filed: Oct. 3, 2023

(65) Prior Publication Data

US 2024/0181962 A1 Jun. 6, 2024

(30) Foreign Application Priority Data

Dec. 6, 2022 (KR) ........................ 10-2022-0169078

(51) Int. Cl.
| | |
|---|---|
| *B62D 15/02* | (2006.01) |
| *B60Q 3/283* | (2017.01) |
| *B60Q 3/80* | (2017.01) |
| *B60W 50/16* | (2020.01) |

(52) U.S. Cl.
CPC ............. *B60Q 3/80* (2017.02); *B60Q 3/283* (2017.02); *B62D 15/029* (2013.01); *B60Q 2300/12* (2013.01); *B60Q 2800/10* (2022.05)

(58) Field of Classification Search
CPC ........ B62D 15/02; B62D 15/029; B62D 1/04; B60W 50/16; B60W 40/08; B60W 60/00; B60R 11/02
See application file for complete search history.

(56) References Cited

U.S. PATENT DOCUMENTS

| | | | |
|---|---|---|---|
| 2009/0063053 A1* | 3/2009 | Basson | G08G 1/167 702/1 |
| 2011/0257846 A1* | 10/2011 | Bennett | B60Q 1/509 701/45 |
| 2018/0015826 A1* | 1/2018 | Ahmad | B60K 35/22 |
| 2020/0262340 A1* | 8/2020 | Prill | B62D 1/046 |
| 2021/0080949 A1* | 3/2021 | Takeda | B62D 1/06 |
| 2021/0221285 A1* | 7/2021 | Kihara | B60K 35/60 |
| 2022/0169173 A1* | 6/2022 | Yoo | B60Q 3/283 |
| 2025/0042254 A1* | 2/2025 | Ishikawa | B60K 35/28 |

FOREIGN PATENT DOCUMENTS

KR 10-2018-0120396 A 11/2018

* cited by examiner

*Primary Examiner* — Tan Q Nguyen
(74) *Attorney, Agent, or Firm* — NovoTechIP International PLLC

(57) ABSTRACT

A message transmission system for a mobility vehicle includes a lighting unit mounted in a steering wheel of the mobility vehicle. Light output is varied according to various traveling situations of the mobility vehicle provide alert to a driver. Accordingly, when an emergency situation occurs during traveling of the mobility, the driver can quickly respond to the emergency situation, thereby ensuring the stability of the traveling mobility vehicle. In addition, the lighting unit mounted in the steering wheel provides an aesthetic appeal to a driver, thereby improving marketability.

14 Claims, 6 Drawing Sheets

MESSAGE TRANSMISSION SYSTEM FOR MOBILITY VEHICLE

CROSS-REFERENCE TO RELATED APPLICATIONS

The present application claims priority to Korean Patent Application No. 10-2022-0169078, filed Dec. 6, 2022, the entire contents of which is incorporated herein for all purposes by this reference.

TECHNICAL FIELD

The present disclosure relates to a message transmission system for a mobility vehicle, the system being capable of alerting a driver to deal with a traveling situation of the mobility vehicle in order to ensure safe traveling.

BACKGROUND

Vehicles travel by driving wheels for the purpose of transporting people or goods.

In addition to a fundamental traveling function, these vehicles have additional functions for user convenience, such as a radio function, an audio function, a video function, a route guidance function, an air conditioning function, a seat heating function, and an outside imaging function.

In addition to these functions for a driver's in-vehicle convenience, the vehicles have also been recently equipped with an autonomous driving function.

An autonomous traveling function of a mobility vehicle is to transmit an alarming sound or generate a message on an instrument panel when the driver does not grip a steering wheel for a predetermined time.

However, a driver has difficulty in recognizing an alert through the transmission of the alarming sound due to ambient noise when he/she increases the music volume, engages in a conversation with another occupant, or opens a vehicle window.

In addition, the driver does not always check an instrument panel during traveling of the mobility vehicle. For this reason, even when a message indicating that the driver has to grip the steering wheel, the driver may not recognize this message.

The foregoing is intended merely to aid in understanding the background of the present disclosure and therefore should not be interpreted to admit that the present disclosure falls within the purview of the related art that is already known to a person of ordinary skill in the art.

SUMMARY

An object of the present disclosure is to provide a message transmission system for a mobility vehicle, the system being capable of alerting a driver to grip a steering wheel when a predetermined time elapses during autonomous traveling of the mobility vehicle and thus of promptly dealing with an occurrence of an emergency situation, thereby ensuring the stability of the traveling mobility vehicle.

In order to accomplish the above-mentioned object, according to an aspect of the present disclosure, there is provided a message transmission system for a mobility vehicle, the system including: a lighting unit mounted in a steering wheel and configured to be selectively turned on in a specific region of the steering wheel; and a control unit configured to turn on the lighting unit in a predetermined pattern that varies according to a traveling situation of the mobility vehicle.

In the message transmission system, the lighting unit may be installed in a rim of the steering wheel or a hub of the steering wheel.

In the message transmission system, the lighting unit may be configured with a plurality of light sources, may provide point lighting or surface lighting in the specific region of the steering wheel, and may realize various lighting patterns, depending on how each of the light sources is turned on.

The message transmission system may further include a sensing unit mounted in the steering wheel and configured to sense a driver's motion that is applied exerted on the steering wheel, wherein, when recognizing through the sensing unit that the driver does not grip the steering wheel, the control unit turns on the lighting unit in a predetermined pattern.

In the message transmission system, the sensing unit may be configured as a pressure sensor that is installed in a rim or a hub of the steering wheel and detects pressure applied to the steering wheel.

In the message transmission system, the sensing unit may be configured as a torque sensor that is installed in a column of the steering wheel and detects rotational torque that occurs when operating the steering wheel.

In the message transmission system, in a case where the driver's motion is not detected through the sensing unit for a preset time in a situation where the mobility vehicle travels autonomously, the control unit may control the lighting unit in such a manner as to be turned on in a predetermined pattern.

In the message transmission system, in the case where the driver's motion is not detected through the sensing unit for the preset time, the control unit may make one or more of a lighting pattern, a lighting color, and lighting brightness for warning vary with the passage of time after the preset time elapses.

In the message transmission system, when an indicator light is turned on, the control unit may control the lighting unit in such a manner that one or more of a lighting pattern, a lighting color, and lighting brightness of the lighting unit are adjusted in unison with the turning-on of the indicator light.

In the message transmission system, when a battery in the mobility vehicle is charged, the control unit may control the lighting unit in such a manner that one or more of a lighting pattern, a lighting color, and lighting brightness thereof are adjusted based on a charge level of the battery.

In the message transmission system, when, based on road information, it is determined that the mobility vehicle is to travel on a curved road, the control unit may control the lighting unit in a predetermined pattern.

In the message transmission system, when obstacles including other vehicles are detected in the vicinity of the mobility vehicle, the control unit may control the lighting unit in such a manner as to be turned on in a predetermined pattern.

In the message transmission system, the control unit may control the lighting unit in such a manner that one or more of a lighting pattern, a lighting color, and lighting brightness thereof are adjusted based on a traveling speed of the mobility vehicle.

In the message transmission system, when an abnormality occurs in the mobility vehicle, the control unit may control the lighting unit in such a manner that one or more of a lighting pattern, a lighting color, and lighting brightness thereof are adjusted.

The lighting unit providing visual information is mounted in the steering wheel of the message transmission system for a mobility vehicle, which employs the structure as described above. A message is transmitted through the lighting unit, depending on various traveling situations. This transmission alerts the driver to grip the steering wheel.

Accordingly, when an emergency situation occurs during traveling of the mobility vehicle, the driver can quickly respond to the emergency situation, thereby ensuring the stability of the traveling mobility vehicle.

In addition, the lighting unit mounted in the steering wheel provides an aesthetic appeal to the driver, thereby improving marketability.

DETAILED DESCRIPTION

Figure 1:
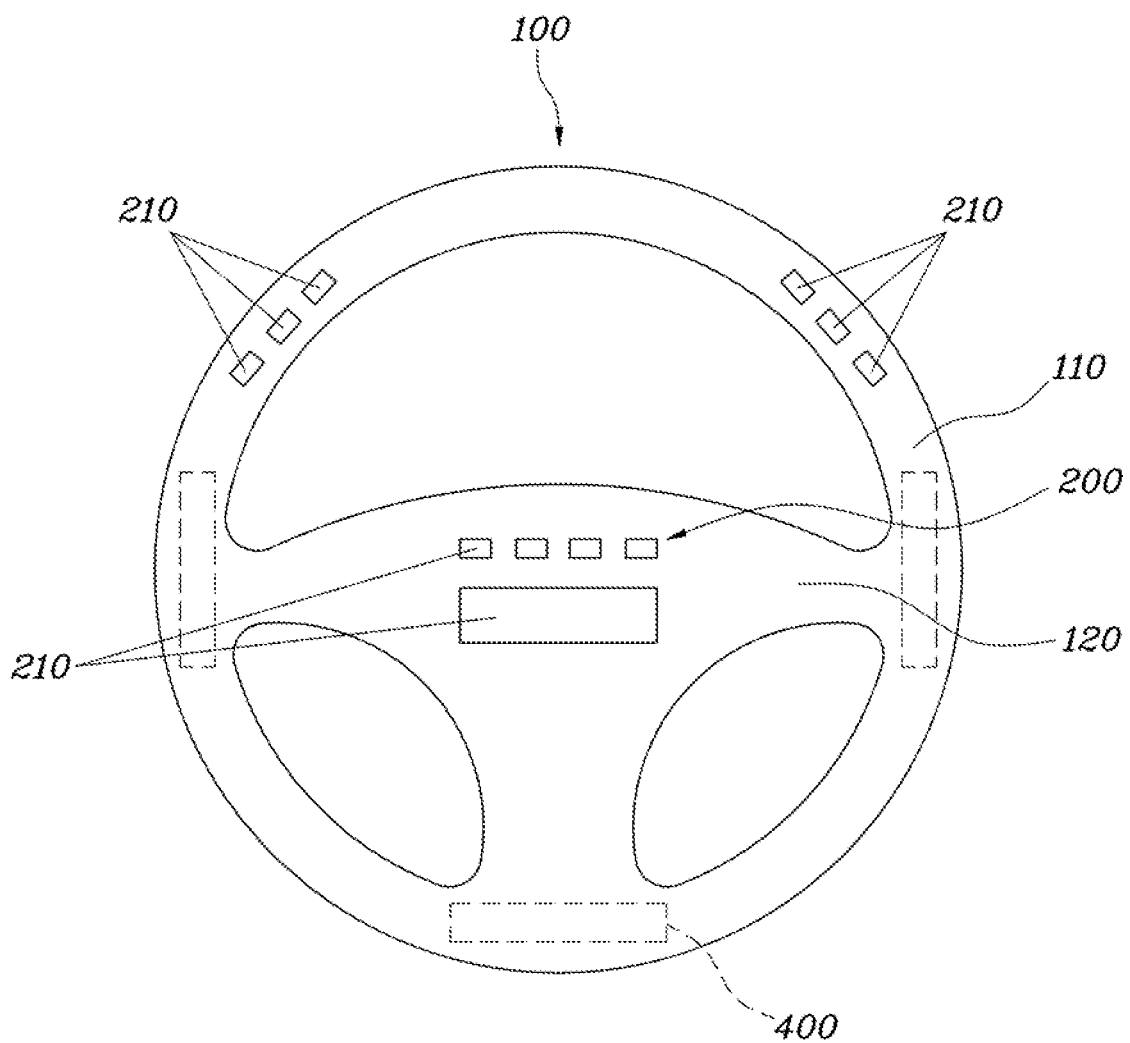
FIG. 1 is a view illustrating an implementation example of a steering wheel according to the present disclosure.

For the purpose of disclosure, embodiments of the present disclosure will be described in detail below referring to the accompanying drawings. The same or similar constituent elements are given the same reference numeral, and descriptions thereof are not repeated.

The terms "module" and "unit" are hereinafter interchangeably or individually used to refer to a constituent element only for convenience in description in the present specification and therefore are not themselves intended to take on different meanings or to depict different functions.

In describing the embodiments of the present disclosure, a detailed description of a well-known technology related thereto will be omitted when determined as making the nature and gist of the present disclosure obfuscated. In addition, the accompanying drawings serve only to help easily understand the embodiments disclosed in the present specification. It should be understood that the technical idea disclosed in the present specification is not limited by the accompanying drawings and that any alteration of, any equivalent of, and any substitute for, a constituent element according to the present disclosure that fall within the scope of the technical idea of the present disclosure are included within the scope of the present disclosure.

The terms "first," "second," and so on are used to describe various constituent elements, but do not impose any limitation on the various constituent elements. These terms are used only to distinguish one constituent element from another.

It should be understood that a constituent element, when referred to as being "coupled to" or "connected to" a different constituent element, may also be directly coupled to or directly connected to the different constituent element or may also be coupled to or connected to the different constituent element with a third constituent element in between. Likewise, it should be understood that a constituent element, when referred to as being "directly coupled to" or "directly connected to" a different constituent element, may be coupled to or connected to the different constituent element with a third constituent element in between.

A noun in singular form has the same meaning as when used in plural form, unless it has a different meaning in context.

The terms "include," "have," and the like in the present application are intended to indicate that a feature, a number, a step, an operation, a constituent element, a component, or a combination of these, which is described in the specification, is present, and thus should be understood not to preclude the possibility that one or more other features, numbers, steps, operations, constituent elements, components, or combinations of these will be present or added.

A controller may include a communication device that communicates with another controller or a sensor in order to control a function for which the controller is responsible, a memory in which an operating system or logic command, input and output information, and the like are stored, and one or more processors that perform judgment, computation, determination, and the like that are necessary to control the function for which the controller is responsible.

A message transmission system for a mobility vehicle according to a desired embodiment of the present disclosure will be described below with reference to the accompanying drawings.

Figure 2:
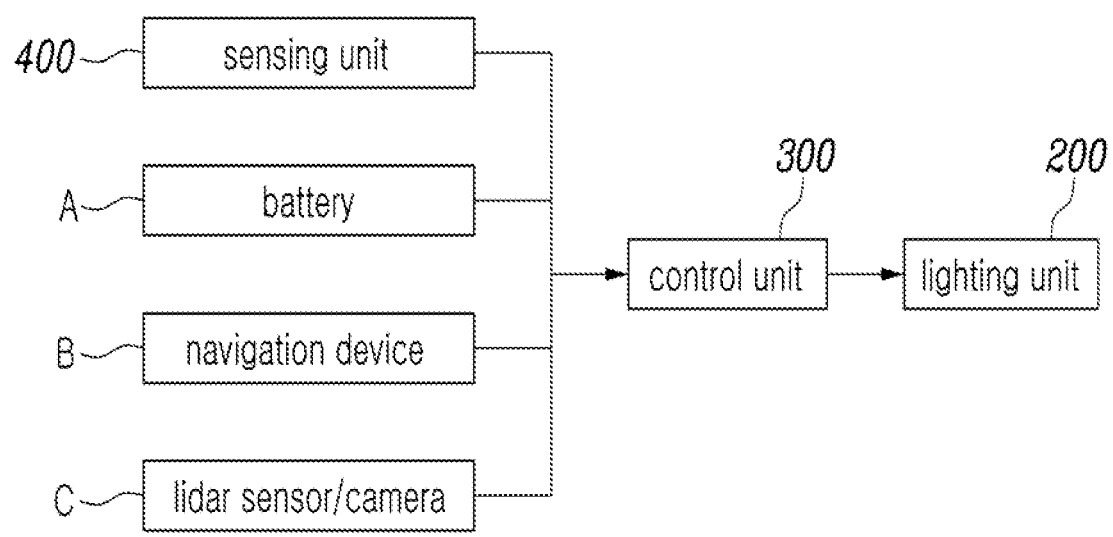
FIG. 2 is a view illustrating a configuration of a message transmission system for a mobility vehicle according to the present disclosure.
Figure 3:
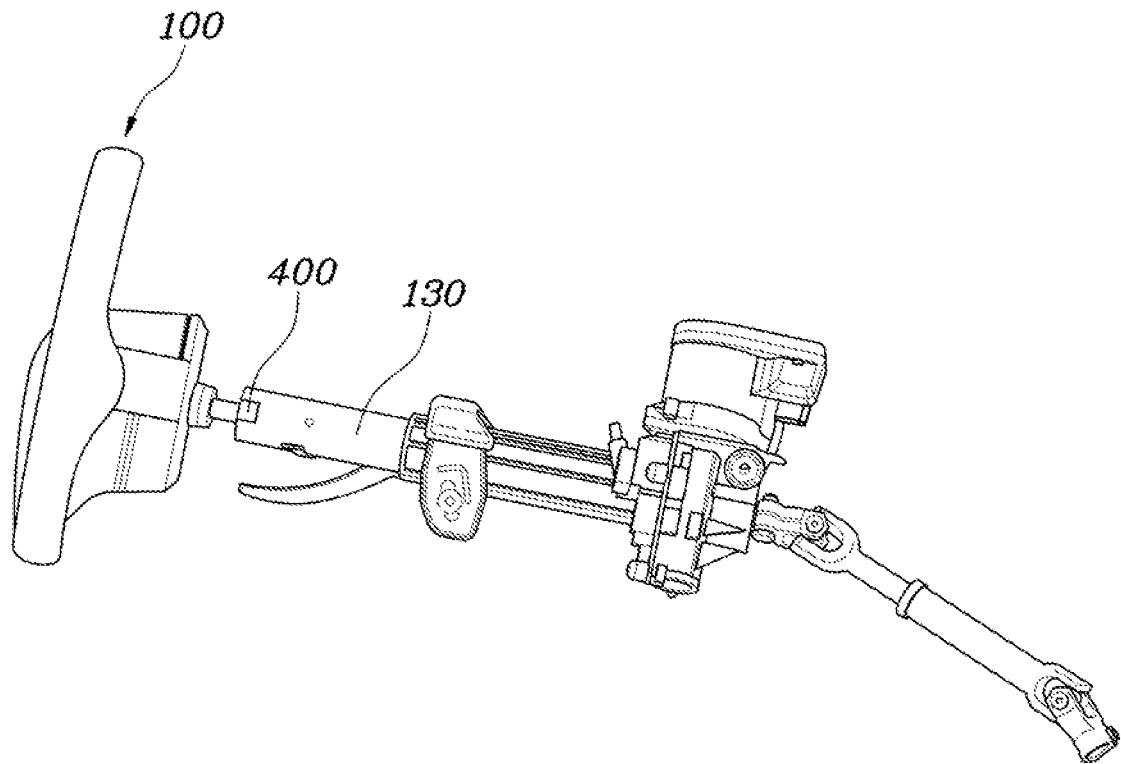
FIG. 3 is a view illustrating a sensing unit of another implementation of the steering wheel according to the present disclosure.

FIG. 1 is a view illustrating an implementation example of a steering wheel according to the present disclosure. FIG. 2 is a view illustrating a configuration of a message transmission system for a mobility vehicle according to the present disclosure. FIG. 3 is a view illustrating a sensing unit of another implementation of the steering wheel according to the present disclosure.

Figure 4:
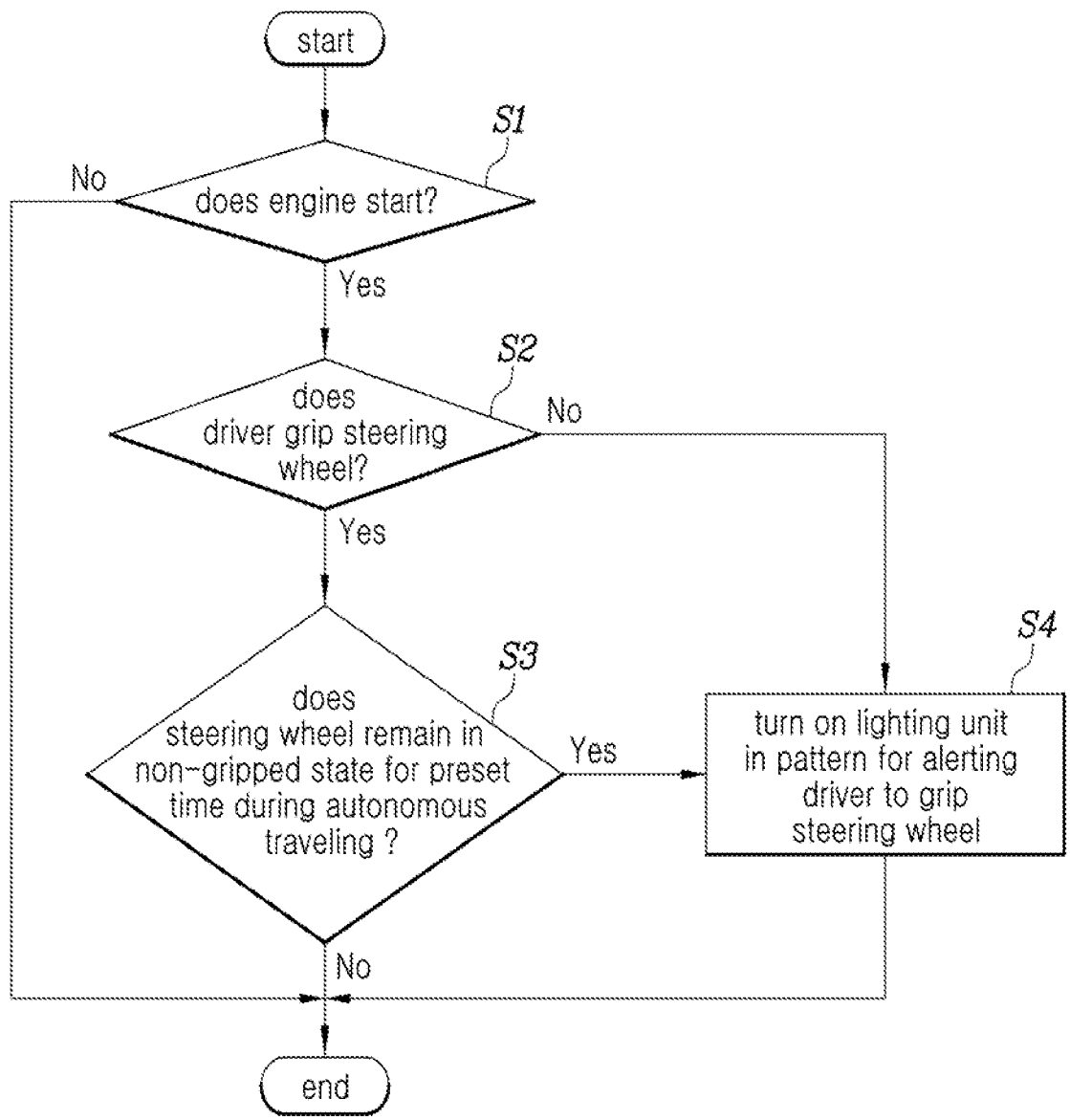
FIG. 4 is a control flowchart for a message transmission system for a mobility vehicle according to a first embodiment of the present disclosure.
Figure 5:
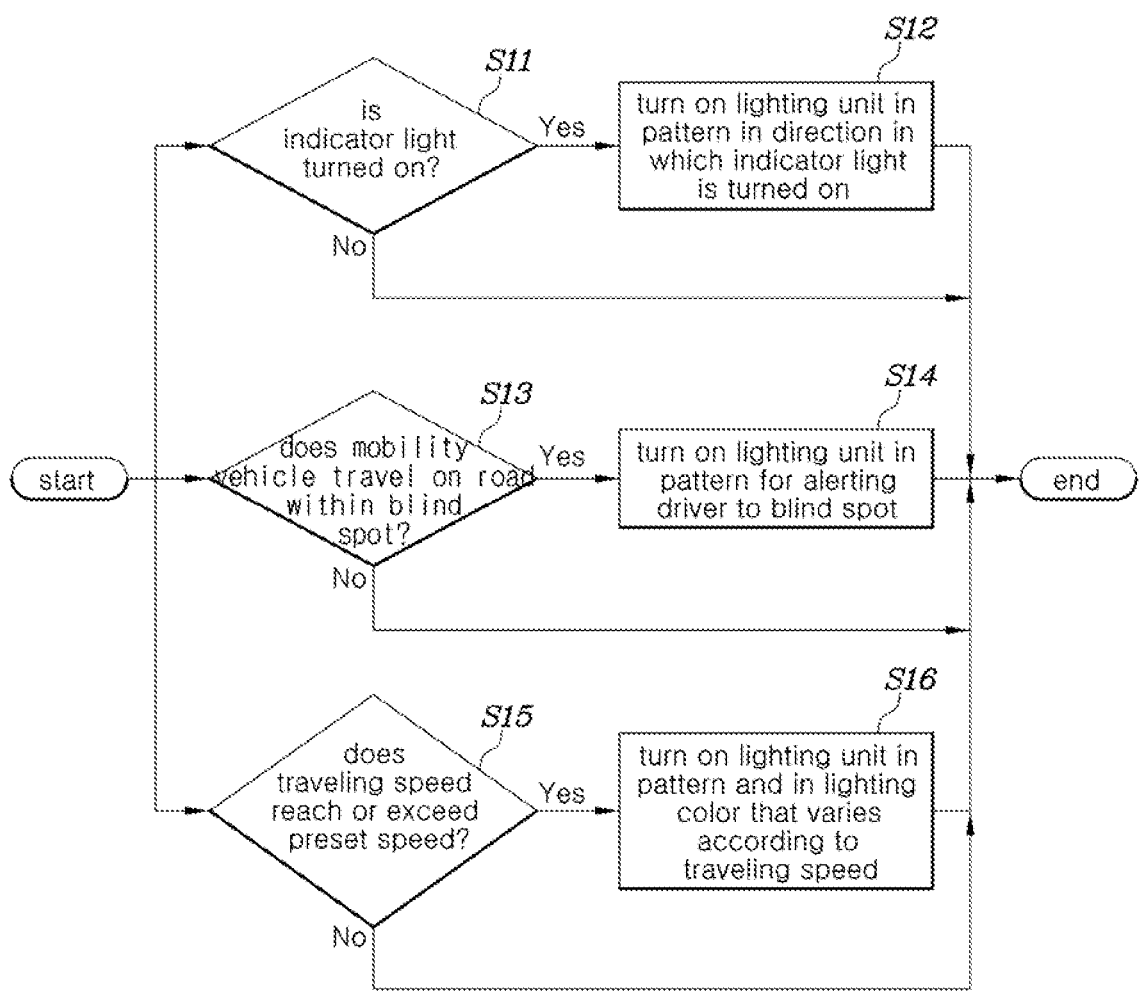
FIG. 5 is a control flowchart for a message transmission system for a mobility vehicle according to a second embodiment of the present disclosure.
Figure 6:
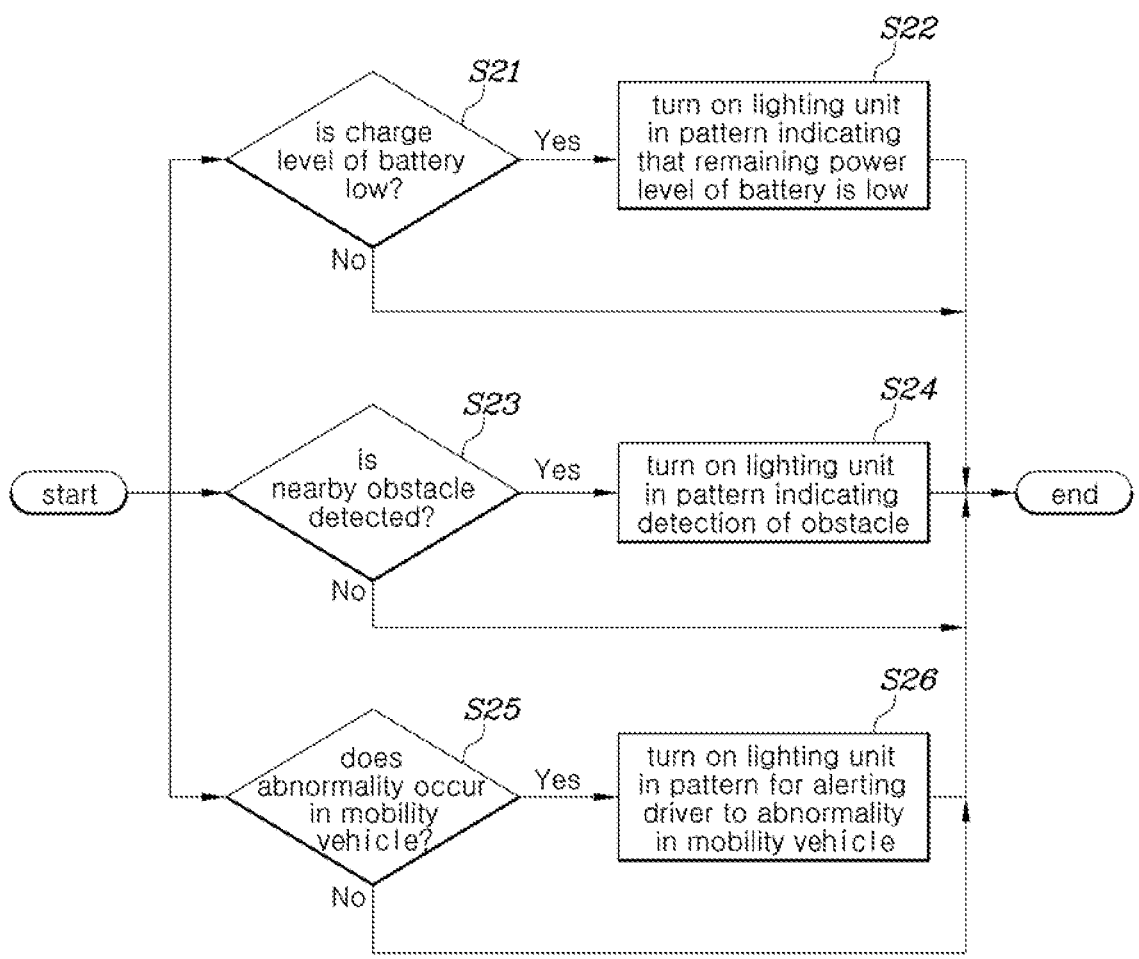
FIG. 6 is a control flowchart for a message transmission system for a mobility vehicle according to a third embodiment of the present disclosure.

FIG. 4 is a control flowchart for a message transmission system for a mobility vehicle according to a first embodiment of the present disclosure. FIG. 5 is a control flowchart for a message transmission system for a mobility vehicle according to a second embodiment of the present disclosure. FIG. 6 is a control flowchart for a message transmission system for a mobility vehicle according to a third embodiment of the present disclosure.

The message transmission system for a mobility vehicle according to the present disclosure, as illustrated in FIGS. 1 and 2, includes a lighting unit 200 that is mounted on a steering wheel 100 and is selectively turned on a specific region of the steering wheel 100, and control unit 300 that turns on the lighting unit 200 in a predetermined pattern according to a traveling situation of the mobility vehicle.

According to the present disclosure, the lighting unit 200 is mounted on the steering wheel 100, and, when a command of the control unit 300 is input into the lighting unit 200, the lighting unit 200 is turned on in various predetermined patterns to transmit a message to a driver.

That is, the lighting unit 200 is installed on the steering wheel 100 and emits light in a specific region of the steering wheel 100 to alert the driver to a state of the mobility vehicle or a situation of the mobility vehicle, as visual information.

In addition, the lighting unit 200 may be turned on in the specific region of the steering wheel 100 and thus may realize various lighting patterns that vary with a message to be transmitted to the driver.

The lighting unit 200 may be installed on a rim 110 of the steering wheel 100 or on a hub 120 of the steering wheel 100.

The rim 110 of the steering wheel 100 is a portion of the steering wheel 100 that is gripped by the driver in order to control the mobility vehicle, and the hub 120 may be an airbag cover arranged in the center of the steering wheel 100.

In this manner, the lighting unit 200 may be installed on the rim 110 or the hub 120 of the steering wheel 100. The lighting units 200 may be installed on the rim 110 and the hub 120, respectively, in order to provide visibility.

The lighting unit 200 may be configured with a plurality of light sources 210, may provide point lighting or surface lighting in the specific region of the steering wheel 100, and may realize various lighting patterns, depending on how each of the light sources 210 is turned on.

That is, the lighting unit 200 provides visual information to the driver through the steering wheel 100. The plurality of light sources 210 may be installed on the specific region of the steering wheel 100 in such a manner that they are spaced a predetermined distance apart.

Accordingly, the lighting unit 200 may be turned on in various ways, depending on how each of the light sources 210 is arranged. As an example, a plurality of light sources 210 are configured in such a manner that they are arranged to be spaced a predetermined distance apart. in order to realize the point lighting. As another example, a separate light guide configured to cover a plurality of light sources 210 may be provided in order to realize the surface lighting.

In this manner, a plurality of light sources 210 in the lighting unit 200 are organized into a single group. Consequently, the lighting unit 200 may display a range of patterns, including an emblem. Accordingly, the lighting unit 200 may provide the driver with not only the visual information, but also an aesthetic appeal.

The message transmission system for a mobility vehicle may further include a sensing unit 400 that is mounted in the steering wheel 100 and detects the driver's motion that is applied to the steering wheel 100. Through the sensing unit 400, it can be checked whether or not the driver can control the mobility vehicle by gripping the steering wheel 100.

As an implementation example according to the first embodiment of the present disclosure, the sensing unit 400 may be configured as a pressure sensor that is installed in the rim 110 or the hub 120 of the steering wheel 100 and detects pressure applied to the steering wheel.

In this manner, it is desired that the sensing unit 400, when configured as the pressure sensor, is installed in the rim 110 of the steering wheel 100. The sensing unit 400 may detect whether or not the mobility vehicle is in a state of being controllable by the driver through the steering wheel 100, by detecting a force applied when the driver grips the steering wheel 100.

In addition, the sensing unit 400 may be configured as a torque sensor that is installed in a column 130 of the steering wheel 100 that detects rotational torque that occurs when operating the steering wheel 100.

As illustrated in FIG. 3, the sensing unit 400, when configured as the torque sensor, may be installed in the column 130 of the steering wheel 100. The sensing unit 400 may check whether or not the mobility vehicle is in the state of being controllable by the driver through the steering wheel 100, by detecting micro-torque that occurs when operating the steering wheel 100.

The sensing unit 400 may be configured with both the pressure sensor installed in the steering wheel 100 and the torque sensor installed in the column 130 of the steering wheel 100. Thus, the sensing unit 400 may detect more precisely whether or not the driver grips the steering wheel 100.

Particularly, the control unit 300 receives information, as an input, through the sensing unit 400. When recognizing through the sensor unit 400 that the driver does not grip the steering wheel 100, the controller 300 turns on the lighting unit 200 in a predetermined pattern.

That is, when information indicating that the driver does not grip the steering wheel 100 is input into the controller 300 through the sensing unit 400, the control unit 300 determines that the driver does not recognize a current traveling situation and, as a result, cannot quickly respond to the current traveling situation. Thus, the control unit 300 alerts the driver to grip the steering wheel 100, by turning on the lighting unit 200 in a predetermined.

Specifically, in a case where the driver's motion is not detected through the sensing unit 400 for a preset time in a situation where the mobility vehicle travels autonomously, the control unit 300 may control the lighting unit 200 in such a manner as to be turned on in a predetermined pattern.

The mobility vehicle may be configured in such a manner as to travel autonomously on the basis of information collected through a plurality of sensing devices including a lidar sensor and a camera C. However, during autonomous traveling of the mobility vehicle, an advanced driver assistance system (ADAS) assists the mobility vehicle in traveling autonomously. Therefore, the driver has to recognize a traveling situation and directly control the mobility vehicle according to the traveling situation. In other words, the autonomous traveling of the mobility vehicle according to the present disclosure corresponds to a partial automation step. In a specific situation, the ADAS is partially in charge of controlling the mobility vehicle. Therefore, the driver has to directly control braking, acceleration, and steering.

Accordingly, when recognizing through the sensing unit 400 that the driver does not grip the steering wheel 100 during the autonomous traveling of the mobility vehicle, the control unit 300 alerts the driver to directly control the mobility vehicle through the operation of the steering wheel 100, by turning on the lighting unit 200 in a predetermined pattern.

Various lighting patterns in which the control unit 300 turns on the lighting unit 200 may include sequential lighting, blinking, lighting-color changing, and the like.

That is, when the sensing unit 400 does not detect the driver's motion for a preset time or longer during the autonomous traveling of the mobility vehicle, the control unit 300 determines that the driver does not recognize the traveling situation and then turns on the lighting unit 200. At this point, the control unit 300 may transmit a message indicating that the driver has to grip the steering wheel 100, by turning on the lighting unit 200 in a simple lighting pattern.

At this point, when the sensing unit 400 does not detect the driver's motion for a preset time, the control unit 300 makes one or more of a lighting pattern, a lighting color, and lighting brightness for warning vary with the passage of time after the preset time elapses.

In a case where the time for which the driver does not grip the steering wheel 100 reaches a preset time, the control unit 300 primarily transmits a warning message by turning on the lighting unit 200. If the driver's motion is not continuously detected after the preset time, the control unit 300 secondarily transmits a warning message. When secondarily transmitting the warning message, the control unit 300 changes the lighting pattern in which the lighting unit 200 is turned on, in order to transmit a stronger signal than when the warning message is primarily transmitted and thus to provide higher visibility. For example, the control unit 300 may turn on the lighting unit 200 in a blinking pattern, in a sequential lighting pattern, with changed lighting color, or with high lighting brightness.

When an indicator light is turned on, the control unit 300 controls the lighting unit 200 in such a manner that one or more of the lighting pattern, the lighting color, and the lighting brightness of the lighting unit 200 are adjusted in unison with the turning-on of the indicator light.

In this manner, when the indicator light in the mobility vehicle is turned on, the control unit 300 turns on the lighting unit 200 in unison with the turning-on of the indicator light. As an example, when a left indicator light is turned on, the control unit 300 may sequentially turn on the light sources 210 of the lighting unit 200 from right to left or may turn on only the light sources 210 on the left side of the lighting unit 200.

As a result, the driver may recognize more easily the direction in which the indicator light is turned, and thus the mobility vehicle may travel safely.

When a battery A in the mobility vehicle is charged, the control unit 300 may control the lighting unit 200 in such a manner that one or more of the lighting pattern, the lighting color, and the lighting brightness thereof are adjusted based on a charge level of the battery A.

In this manner, the control unit 300 may display the charge level of the battery A through the lighting unit 200, and thus the driver can check a current remaining power level of the battery A. As an example, when the charge level of the battery A falls short of 20☐, the control unit 200 may change the lighting color of the lighting unit 200, and thus the driver can recognize that the battery A needs to be charged. In addition, as the charge level of the battery A is lowered, the control unit 300 changes the lighting pattern or the lighting color of the lighting unit 200. This change alerts the driver that the battery A needs to be charged.

When, based on road information, it is determined that the mobility vehicle is to travel on a curved road, the control unit 300 in advance controls the lighting unit 200 in a predetermined pattern.

That is, when the road information is input from a navigation device B and it is determined that the mobility vehicle will travel on the curved road, the control unit 300 alerts the driver to prepare for capturing a blind spot, by turning on the lighting unit 200. In this manner, the control unit 300 provides safety driving information to the driver by turning on the lighting unit 200 based on the road information from the navigation device B, thereby helping the mobility vehicle safely travels to a destination.

When obstacles including other vehicles are detected in the vicinity of the mobility vehicle, the control unit 300 may control the lighting unit 200 in such a manner as to be turned on in a predetermined pattern.

That is, the control unit 300 may detect the obstacle present in the vicinity of the mobility vehicle through the lidar sensor, the camera C, or the like. When the obstacle in the vicinity of the mobility vehicle is detected, the control unit 300 alerts the driver to recognize the obstacle by turning on the lighting unit 200. Consequently, a traffic accident is prevented that may occur while the driver does not recognize the obstacle in the vicinity of the mobility vehicle while the mobility vehicle travels. This ensures that the mobility vehicle travels safely.

The control unit 300 may control the lighting unit 200 in such a manner that one or more of the lighting pattern, the lighting color, and the lighting brightness thereof are adjusted based on a traveling speed of the mobility vehicle.

That is, when the mobility vehicle travels at a preset speed or higher, the control unit 300 may turn on the lighting unit 200. The higher the speed at which the mobility vehicle travels, the more frequently the control unit 300 may change the lighting pattern or the lighting color of the lighting unit 200. Alternatively, the control unit 300 may correspondingly increase the lighting brightness of the lighting unit 200. As a result, the driver can recognize that the traveling speed of the mobility vehicle is increased. This ensures that the mobility vehicle travels safely.

When an abnormality occurs in the mobility vehicle, the control unit 300 may control the lighting unit 200 in such a manner that one or more of the lighting pattern, the lighting color, and the lighting brightness thereof are adjusted.

In this manner, when a drive system of the mobility vehicle fails to operate, the control unit 300 determines this failure as an emergency situation and transmits a corresponding message through the lighting unit 200. At this time, the control unit 300 may turn on the lighting unit 200 in such a manner as to emit a red light, and may turn on the lighting unit 200 in a blinking manner. Accordingly, the driver can recognize the failure in the mobility vehicle and can take action to stop the mobility vehicle from traveling. Through failure analysis, measures necessary for the mobility vehicle to travel normally may be taken.

The above-described lighting unit 200 according to the present disclosure may be controlled in a manner that varies with the traveling situation.

That is, as illustrated in the flowchart in FIG. 4, controls associated with Step S1 to S4 may be performed depending on whether or not the driver grips the steering wheel 100 and on an autonomous traveling situation.

In addition, as illustrated in the flowchart in FIG. 5, controls associated with Steps S11 to S16 may be performed depending on a traveling situation of the mobility vehicle.

In addition, as illustrated in the flowchart in FIG. 6, controls associated with Steps S21 to S26 may be performed depending on a state of the mobility vehicle.

The lighting unit 200 providing visual information is mounted in the steering wheel 100 of the message transmission system for a mobility vehicle, which employs the structure as described above. A message is transmitted through the lighting unit 200, depending on various traveling situations. This transmission alerts the driver to grip the steering wheel 100.

Accordingly, when an emergency situation occurs during traveling of the mobility vehicle, the driver can quickly respond to the emergency situation, thereby ensuring the stability of the traveling mobility vehicle.

In addition, the lighting unit 200 mounted in the steering wheel 100 provides an aesthetic appeal to the driver, thereby improving marketability.

The specific embodiments of the present disclosure are described above with every feature thereof being illustrated in the drawings, and it would be obvious to a person of ordinary skill in the art that various modifications and alterations are possibly made to the present disclosure without departing from the technical idea of the present disclosure that is protected by the following claims.

What is claimed is:

1. A message transmission system for a mobility vehicle, the system comprising:

a lighting unit mounted in a steering wheel and configured to be selectively turned on in a specific region of the steering wheel; and a control unit configured to turn on the lighting unit in a predetermined pattern that varies according to a traveling situation of the mobility vehicle, wherein:

the mobility vehicle includes a navigation device that provides road information pertaining to a road on which the mobility vehicle is traveling, and the control unit controls the lighting unit to produce a predetermined light pattern depending on the road information from the navigation device.

2. The message transmission system of claim 1, wherein the lighting unit is installed in a rim of the steering wheel or a hub of the steering wheel.

3. The message transmission system of claim 1, wherein the lighting unit includes a plurality of light sources that provide point lighting or surface lighting in the specific region of the steering wheel and is configured to produce various lighting patterns.

4. The message transmission system of claim 1, further comprising:

a sensing unit mounted in the steering wheel and configured to sense a driver's motion that is applied to the steering wheel, wherein, when the sensing unit determines that the driver is not gripping the steering wheel, the control unit turns on the lighting unit in a predetermined pattern.

5. The message transmission system of claim 4, wherein the sensing unit includes a pressure sensor that is installed in a rim or a hub of the steering wheel to detect pressure applied to the steering wheel.

6. The message transmission system of claim 4, wherein the sensing unit includes a torque sensor that is installed in a column of the steering wheel to detect rotational torque that occurs when a driver is operating the steering wheel.

7. The message transmission system of claim 4, wherein, when the driver's motion is not detected through the sensing unit for a preset time during autonomous travel of the mobility vehicle, the control unit controls the lighting unit to produce a predetermined pattern.

8. The message transmission system of claim 7, wherein, when the driver's motion is not detected through the sensing unit for the preset time, the control unit causes the lighting unit to produce one or more of a predetermined lighting pattern, a predetermined lighting color, and a predetermined lighting brightness that vary with a passage of time after the preset time elapses.

9. The message transmission system of claim 1, wherein, when an indicator light is turned on, the control unit controls the lighting unit to adjust one or more of a lighting pattern, a lighting color, and lighting brightness in unison with a turning-on of the indicator light.

10. The message transmission system of claim 1, wherein, when a battery in the mobility vehicle is charged, the control unit controls the lighting unit to adjust one or more of a lighting pattern, a lighting color, and lighting brightness based on a charge level of the battery.

11. The message transmission system of claim 1, wherein the control unit controls the lighting unit to produce a predetermined light pattern depending on a condition of a road on which the mobility vehicle is traveling.

12. The message transmission system of claim 1, wherein, the control unit controls the lighting unit to produce a predetermined light pattern when obstacles are detected in a vicinity of the mobility vehicle.

13. The message transmission system of claim 1, wherein the control unit controls the lighting unit to adjust one or more of a lighting pattern, a lighting color, and lighting brightness based on a traveling speed of the mobility vehicle.

14. The message transmission system of claim 1, wherein the control unit controls the lighting unit to produce one or more of a predetermined lighting pattern, a predetermined lighting color, and a predetermined lighting brightness when an abnormality occurs in the mobility vehicle.

\* \* \* \* \*